(12) United States Patent
Wang

(10) Patent No.: US 8,206,503 B2
(45) Date of Patent: Jun. 26, 2012

(54) METHOD AND COMPOSITION FOR MAKING A CONCRETE PRODUCT FROM SLUDGE

(76) Inventor: Chin-Chung Wang, Yongkang (TW)

( * ) Notice: Subject to any disclaimer, the term of this patent is extended or adjusted under 35 U.S.C. 154(b) by 723 days.

(21) Appl. No.: 12/322,016

(22) Filed: Jan. 27, 2009

(65) Prior Publication Data

US 2010/0186635 A1    Jul. 29, 2010

(51) Int. Cl.
*C04B 18/08* (2006.01)
(52) U.S. Cl. ........ 106/697; 106/705; 106/713; 588/256; 588/257
(58) Field of Classification Search .......... 106/697, 106/705, 713; 588/256, 257
See application file for complete search history.

(56) References Cited

U.S. PATENT DOCUMENTS

| 3,600,476 | A | * | 8/1971 | Suzuki et al. | 106/745 |
| 5,057,009 | A | * | 10/1991 | Nechvatal et al. | 432/14 |
| 5,500,044 | A | * | 3/1996 | Meade et al. | 106/697 |
| 5,669,969 | A | * | 9/1997 | Meade et al. | 106/697 |
| 6,962,562 | B2 | * | 11/2005 | Depelsenaire et al. | 588/256 |
| 7,655,088 | B2 | * | 2/2010 | Bethani | 106/705 |

* cited by examiner

Primary Examiner — Paul Marcantoni

(57) ABSTRACT

A method for making a sludge aggregate concrete includes the steps of collecting and dehydrating sludge, sintering the sludge at a temperature of about 800–900° C., grinding and sieving the sludge through a screen to obtain sludge ash, forming the sludge ash into an artificial sludge aggregate by mixing the sludge ash with an inorganic binder and water followed by granularizing, and mixing the artificial sludge aggregate with an inorganic binder and water to form the sludge aggregate concrete product.

8 Claims, 11 Drawing Sheets

METHOD AND COMPOSITION FOR MAKING A CONCRETE PRODUCT FROM SLUDGE

BACKGROUND OF THE INVENTION

1. Field of the Invention

This invention relates to a concrete product, more particularly to a concrete product which includes artificial sludge aggregates made from sludge, and a method of making the same.

2. Description of the Related Art

Currently, coals burnt in a thermal power plant produce many by-products, such as lightweight inflammable matters and a small amount of unburned carbon. These by-products flow together with exhaust gas, during the burning process, through a furnace chamber, a superheater, an economizer, and an air preheater where the by-products are cooled to about 35° C. These by-products are caught by the static electric dust collecting device as fly ash. The grain size of the fly ash is mostly smaller than 20 μm. The fly ash generally includes $SiO_2$, $Al_2O_3$, and $Fe_2O_3$. The fly ash has a pH value ranging from 5.2 to 7.4.

Recycling of the fly ash is used in the making of tiles, ceramics, structural lightweight aggregates, foamed concrete blocks, fertilizers, and artificial reef armor blocks. Present statistics reveals that the annual production of the fly ash amounted to approximately 1.2 million tons, and the rate of use thereof is only 58.6%. The unused fly ash is thrown away and is directly buried on the ground. This destroys the soil, the mountains, and the streams. Hence, the problem of re-treating and recycling the fly ash still remains to be solved.

Further, furnace slag is a by-product produced in iron-smelting, and may be divided into two kinds according to the method of production, i.e., air-cooled slag and water-quenched slag. Generally, in the production of one ton of pig iron, 0.3 ton of the furnace slag is produced therealong. Air-cooled slag is usually treated as trash, as a graded material for backfilling the sea, or as a backfill in the factory area. The water-quenched slag has a property close to that of the cement, and is usually used as a cement additive for concrete mineral filler. Thus, if the furnace slag is thrown into the trash and is not reused, it will become a new problem to the environment.

SUMMARY OF THE INVENTION

Therefore, an object of the present invention is to provide a method for making a concrete product. The method makes use of a mixture of an aggregate from sludge, fly ash from a thermal power plant, water-quenched slag ash, and cement to form the concrete product. Recycling and reused of trash materials are achieved.

Another object of the present invention is to provide a concrete product made from the aforesaid method.

According to one aspect of this invention, a method for making a sludge aggregate concrete product includes the steps of: (A) collecting and dehydrating sludge; (B) sintering the sludge at a temperature of about 800~900° C.; (C) grinding and sieving the sludge through a screen to obtain sludge ash; (D) forming the sludge ash into an artificial sludge aggregate by mixing the sludge ash with an inorganic binder and water followed by granularizing; and (E) mixing the artificial sludge aggregate with an inorganic binder and water to form the sludge aggregate concrete product.

According to another aspect of this invention, a composition for making a concrete product comprises an artificial sludge aggregate and an inorganic binder. The artificial sludge aggregate includes fine and coarse sludge aggregates. The coarse sludge aggregate has an average grain diameter of 19 mm~4.76 mm. The inorganic binder is mixed with the coarse and fine sludge aggregates. The artificial sludge aggregate is made by the steps including: (A) collecting and dehydrating sludge; (B) sintering the sludge at a temperature of about 800~900° C.; (C) grinding and sieving the sludge through a screen to obtain sludge ash; and (D) forming the sludge ash into the artificial sludge aggregate by mixing the sludge ash with an inorganic binder and water, followed by granularizing.

BRIEF DESCRIPTION OF THE DRAWINGS

Other features and advantages of the present invention will become apparent in the following detailed description of the present invention, with reference to the accompanying drawings, in which.

DETAILED DESCRIPTION OF THE PREFERRED EMBODIMENTS

Figure 1:
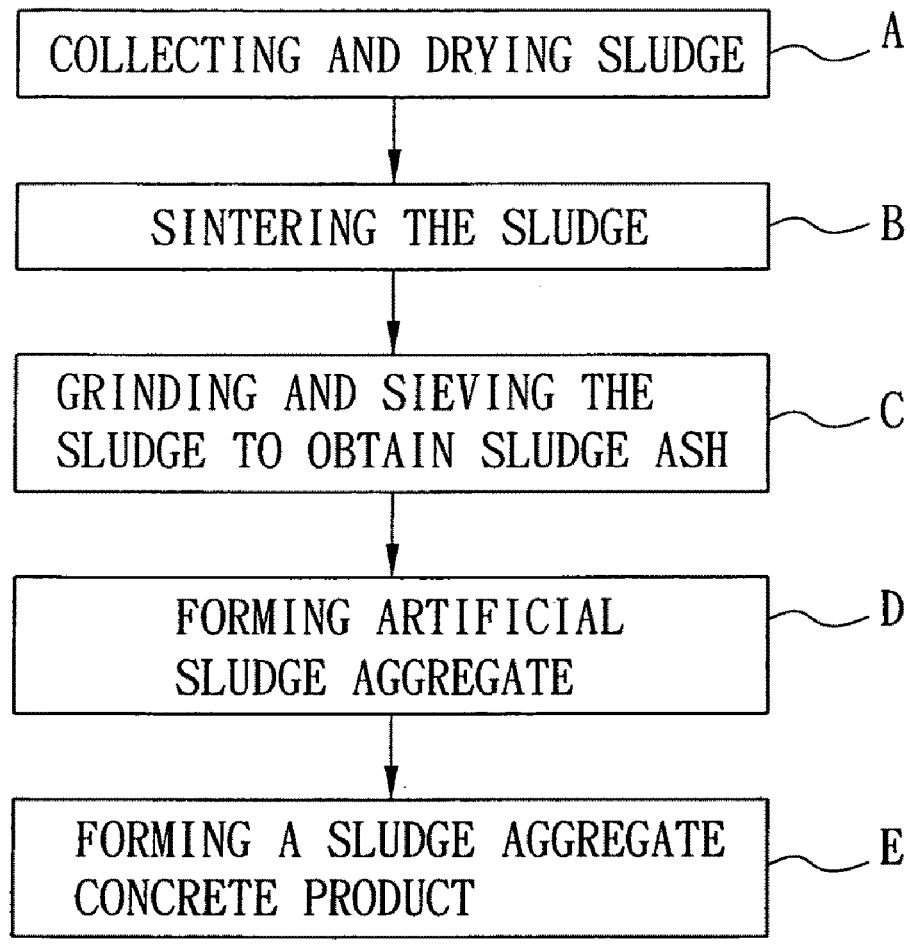
FIG. 1 is a flow chart, illustrating the steps involved in making a concrete product according to the present invention.
Figure 2:
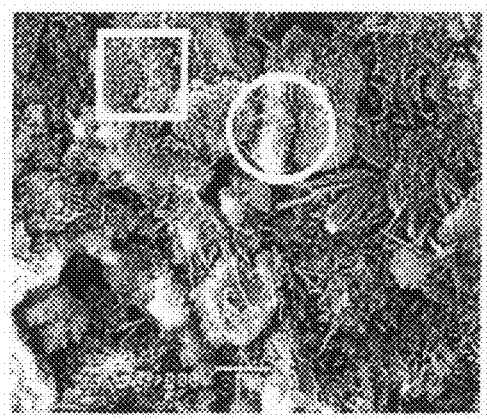
FIG. 2 is a scanning electron micrograph showing the structure of the artificial sludge aggregate of Example 1 after seven days of curing time.
Figure 3:
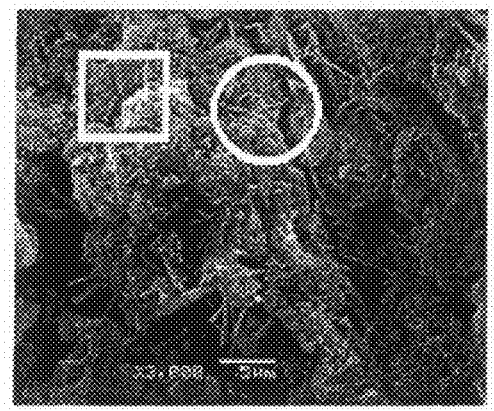
FIG. 3 is a scanning electron micrograph showing the structure of the artificial sludge aggregate of Example 2 after seven days of curing time.
Figure 4:
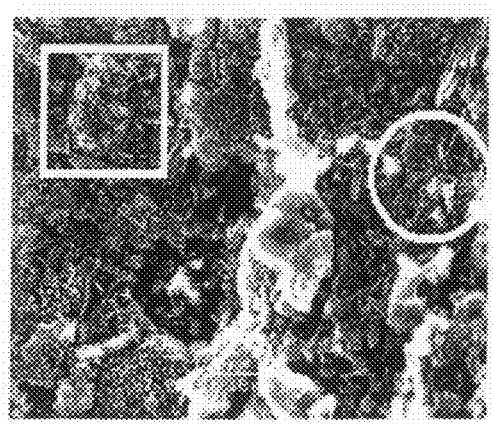
FIG. 4 is a scanning electron micrograph showing the structure of the artificial sludge aggregate of Example 3 after seven days of curing time.
Figure 5:
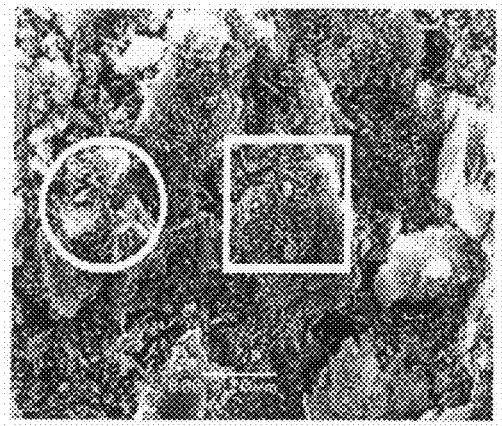
FIG. 5 is a scanning electron micrograph showing the structure of the artificial sludge aggregate of Example 4 after seven days of curing time.

Referring to FIG. 1, a method for making a sludge aggregate concrete product according to the present invention is shown to comprise steps (A) to (E).

Step (A). Collecting and Dehydrating

Sludge is collected and dehydrated. The sludge may be obtained from a sewage treatment plant or the sludge sedimented in a water reservoir. In this embodiment, the sludge from the sewage treatment plant is used. The sludge is then dehydrated so as to minimize water content therein and to form blocks.

Step (B). Sintering

The dehydrated sludge is sintered in a brick kiln at a temperature of about 800~900° C., the purpose of which is to burn away the organic matter in the sludge, and at the same time, to deodorize and reduce the volume of the sludge.

Step (C). Grinding and Sieving

Because the sludge is in the form of sludge blocks during the sintering process, the sludge blocks must therefore undergo a grinding process. After grinding, the ground sludge is sieved through a screen having a sieve size of 0.15 mm, which conforms to ASTM sieve size #100, to thereby obtain sludge ash. The main purpose of this step is to increase contact surface area so that the sludge ash can easily mix with a pozzolanic material in the subsequent processing step, and to increase contact surface area between the mixture and water so as to speed up the rate of hydration, thereby enhancing mechanical strength of a formed product.

Table 1 includes ASTM sieve sizes and equivalent metric sieve sizes. Table 1 shows that the grain size of the sludge ash that passes through the ASTM sieve size #100 is 0.15 mm.

TABLE 1

| | ASTM Sieve size Number | | | | | | |
|---|---|---|---|---|---|---|---|
| | 3/4" | #4 | #10 | #20 | #30 | #50 | #100 |
| Metric System (mm) sieve size | 19 | 4.75 | 2.0 | 0.85 | 0.6 | 0.3 | 0.15 |

Step (D). Forming Artificial Sludge Aggregate

The sludge ash obtained in step (C) is mixed with an inorganic binder and water to form artificial sludge aggregates. Tables 2 and 3 demonstrate Examples 1 to 10 for forming artificial sludge aggregates of the present invention. The artificial sludge aggregates in the examples include coarse sludge aggregates having an average grain size of 19 mm~4.76 mm, and fine sludge aggregates having an average grain size smaller than 4.76 mm. In the examples, the inorganic binder is made of a pozzolanic material which may be selected from the group consisting of cement, fly ash, water-quenched slag powder, silicon ash, silica fume, natural pozzolans, rice husk ash, and the like. In a preferred embodiment, the inorganic binder includes cement, water-quenched slag powder, and fly ash. The cement is used for the hardening purposes, while the water-quenched slag powder and the fly ash are used to substitute a portion of the cement. These materials can react with hydrated calcium hydroxide through a slow pozzolanic reaction, thereby resulting in a hardening effect and lowering the leaching process of heavy metals. The fly ash of the present invention comes from the thermal power plant, and the water-quenched slag powder comes from iron-smelting. The purpose of step (D) is to enhance the compressive strength and workability of the artificial sludge aggregates, so that water absorption rate of the artificial sludge aggregates can be lowered, durability of the artificial sludge aggregates can be enhanced, and the leaching of the heavy metals may be minimized. Hence, stability of the artificial sludge aggregates can be increased.

In Examples 1-10, artificial sludge aggregates were formed by mixing the sludge ash with the binder and water according to the weight percents shown in Table 2. The resulting mixtures of the examples were subjected to a grain-making process that includes vacuumizing, extruding, injection molding, rubbing, and granularizing, thus obtaining artificial sludge aggregates having coarse and fine grain sizes. After granularizing, the obtained artificial sludge aggregates undergo a curing process so that hydration of the artificial sludge aggregates is completed. The chemical compositions of Examples 1 to 10 were analyzed and provided in Table 3.

In Tables 2 and 3, the character "C" stands for cement, "S" stands for the water-quenched slag powder, "F" stands for the fly ash, and "SSA" stands for the sewage sludge ash. Generally, the range of the weight percentage for the water-quenched slag powder S is 0~51%, for the fly ash F is 17~28%, for the cement C is 6~67%, and for the sewage sludge ash SSA is 33~50%.

TABLE 2

| Example | Cement (C) wt. % | Water-Quenched Slag Powder (S) Wt. % | Fly Ash (F) wt. % | Sewage Sludge Ash (SSA) wt. % |
|---|---|---|---|---|
| 1 | 50 | — | — | 50 |
| 2 | 67 | — | — | 33 |
| 3 | 57 | — | — | 43 |
| 4 | 40 | 17 | — | 43 |
| 5 | 28 | 28 | — | 44 |
| 6 | 17 | 40 | — | 43 |
| 7 | 28 | — | 28 | 44 |
| 8 | 6 | 51 | — | 43 |
| 9 | 5 | 45 | — | 50 |
| 10 | 40 | — | 17 | 43 |

TABLE 3

| Example No. & Name | Chemical Composition of Sludge Aggregate (wt. %) | | | | | | | | | |
|---|---|---|---|---|---|---|---|---|---|---|
| | CaO | $SiO_2$ | $Fe_2O$ | $Al_2O$ | MgO | $K_2O$ | $Na_2O$ | $Ti_2O$ | MnO | $SO_3$ |
| 1 C50-SSA50 | 33.10 | 37.83 | 6.44 | 10.83 | 2.14 | 1.60 | 0.76 | 0.18 | 0.01 | 1.50 |
| 2 C67-SSA33 | 43.47 | 32.06 | 5.23 | 8.20 | 2.16 | 1.18 | 0.50 | 0.24 | 0.01 | 2.01 |
| 3 C57-SSA43 | 37.37 | 35.45 | 5.94 | 9.75 | 2.14 | 1.43 | 0.65 | 0.21 | 0.01 | 1.71 |
| 4 C40-S17-SSA43 | 34.46 | 38.14 | 5.50 | 11.91 | 1.77 | 1.48 | 0.65 | 0.23 | 0.06 | 1.20 |

TABLE 3-continued

| Example No. & Name | Chemical Composition of Sludge Aggregate (wt. %) | | | | | | | | | |
|---|---|---|---|---|---|---|---|---|---|---|
| | CaO | SiO$_2$ | Fe$_2$O | Al$_2$O | MgO | K$_2$O | Na$_2$O | Ti$_2$O | MnO | SO$_3$ |
| 5 C28-S28-SSA44 | 32.49 | 39.96 | 5.20 | 13.37 | 1.52 | 1.51 | 0.65 | 0.24 | 0.09 | 0.86 |
| 6 C17-S40-SSA43 | 30.53 | 41.78 | 4.90 | 14.83 | 1.26 | 1.54 | 0.65 | 0.25 | 0.13 | 0.51 |
| 7 C28-F28-SSA44 | 21.03 | 43.65 | 6.60 | 16.79 | 1.98 | 1.44 | 0.71 | 0.38 | 0.01 | 0.86 |
| 8 C6-S51-SSA43 | 28.64 | 43.53 | 4.61 | 16.22 | 1.02 | 1.57 | 0.65 | 0.27 | 0.16 | 0.18 |
| 9 C5-S45-SSA50 | 25.40 | 44.94 | 5.27 | 16.55 | 1.15 | 1.73 | 0.76 | 0.23 | 0.14 | 0.15 |
| 10 C40-F17-SSA43 | 27.62 | 40.34 | 6.34 | 13.95 | 2.05 | 1.43 | 0.69 | 0.31 | 0.01 | 1.20 |

For the manufacturing of a concrete product, the longer the curing time of the artificial aggregate, the more complete is the hydration, and the strength of the material is stronger. FIGS. 2 to 11 are photographs that respectively illustrate the structures of examples 1~10 after seven days of curing time. The photographs are taken by the scanning electron microscope (SEM). The squares "□" in photographs indicate calcium silicate hydrate (C—S—H) gel having a spiniferous shape, the circles "○" indicate Ettringite having a hexagonal needle-shape, the rhombuses "◇" indicate an angular granular structure, and the rectangles "▢" indicate a hollow ball-shaped structure.

Figure 6:
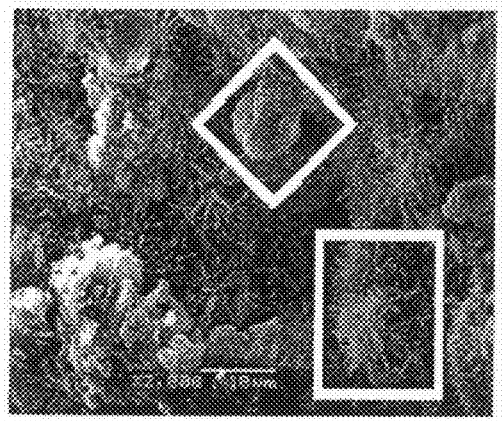
FIG. 6 is a scanning electron micrograph showing the structure of the artificial sludge aggregate of Example 5 after seven days of curing time.
Figure 7:
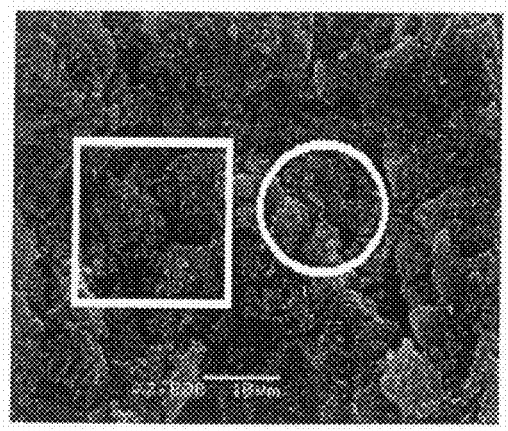
FIG. 7 is a scanning electron micrograph showing the structure of the artificial sludge aggregate of Example 6 after seven days of curing time.
Figure 8:
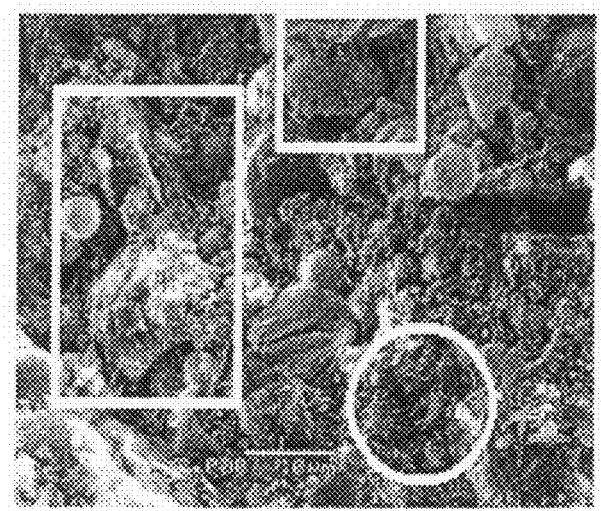
FIG. 8 is a scanning electron micrograph showing the structure of the artificial sludge aggregate of Example 7 after seven days of curing time.

With reference to FIG. 6, the sludge aggregate of Example 5 is composed of a large amount of the angular granular structure and the hollow ball-shaped structure. Further, hydration is substantially complete, and the structure is dense. Hence, Example 5 is suitable for use as the artificial sludge aggregate of the present invention.

Figure 9:
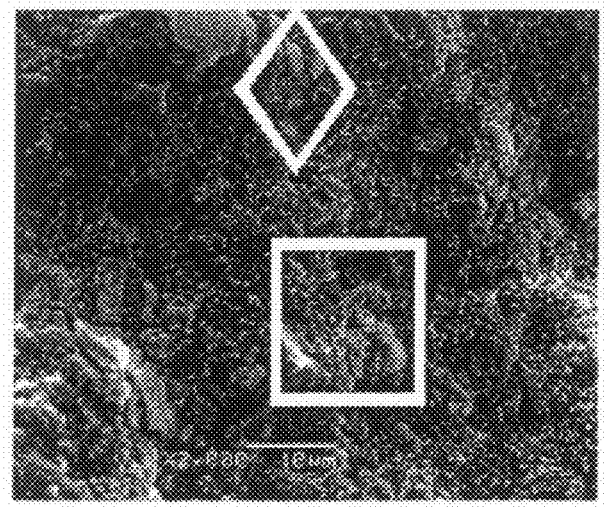
FIG. 9 is a scanning electron micrograph showing the structure of the artificial sludge aggregate of Example 8 after seven days of curing time.
Figure 10:
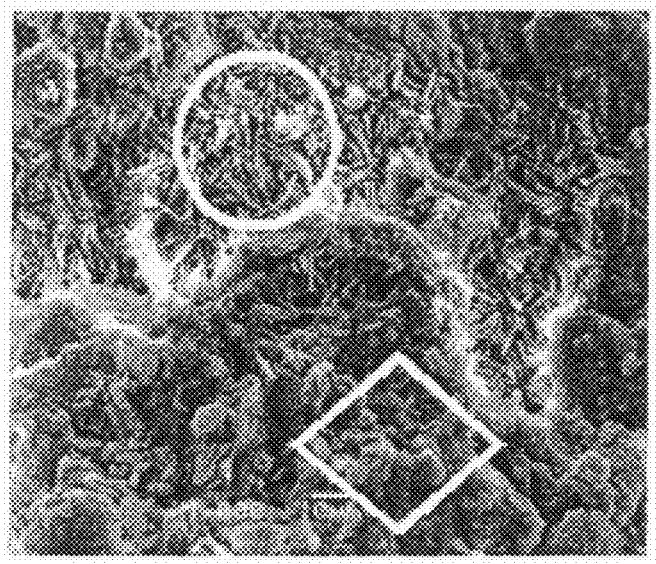
FIG. 10 is a scanning electron micrograph showing the structure of the artificial sludge aggregate of Example 9 after seven days of curing time.
Figure 11:
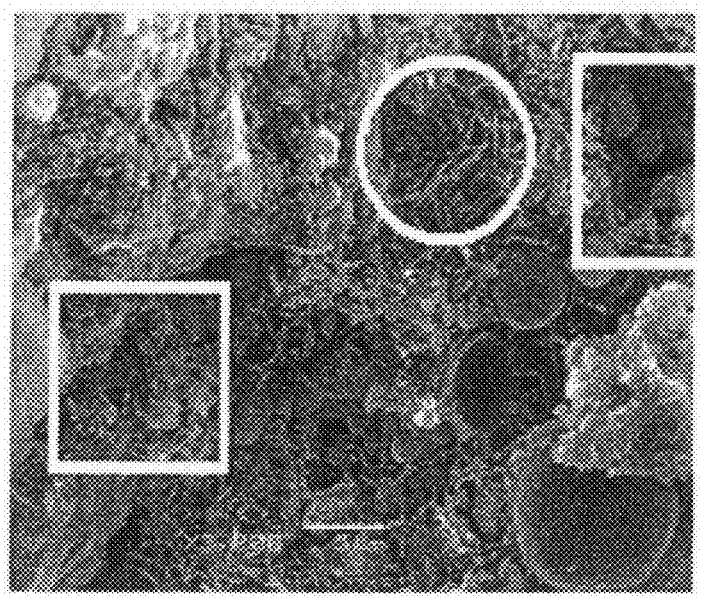
FIG. 11 is a scanning electron micrograph showing the structure of the artificial sludge aggregate of Example 10 after seven days of curing time.

With reference to FIG. 9, the sludge aggregate of Example 8 is composed of a large amount of the spiniferous shaped C—S—H gel structure and the angular granular structure. Further, hydration is substantially complete, and the structure is dense. Hence, Example 8 is suitable for use as the artificial sludge aggregate of the present invention.

Table 4 illustrates the mechanical strengths of Examples 1-10 and a comparative example which is river sand.

TABLE 4

| No. | Example Name | Compressive strength (MPa) (Curing time 28 days) | Grain Density (g/cm$^3$) | | Hydroscopic rate (%) | Fineness Modulus (FM) |
|---|---|---|---|---|---|---|
| | | | Oven-Dried | Saturated Surface-Dry | | |
| 1 | C50-SSA50 | 21.66 | 1.55 | 1.66 | 6.81 | 6.45 |
| 2 | C67-SSA33 | 29.46 | 1.66 | 1.75 | 5.53 | 6.65 |
| 3 | C57-SSA43 | 27.05 | 1.74 | 1.84 | 5.88 | 6.45 |
| 4 | C40-S17-SSA43 | 29.13 | 1.69 | 1.86 | 10 | 6.75 |
| 5 | C28-S28-SSA44 | 37.25 | 1.73 | 1.92 | 11.1 | 6.85 |
| 6 | C17-S40-SSA43 | 30.03 | 1.60 | 1.79 | 11.57 | 6.50 |
| 7 | C28-F28-SSA44 | 14.03 | 1.39 | 1.61 | 16.18 | 6.48 |
| 8 | C6-S51-SSA43 | 17.15 | 1.74 | 1.89 | 8.56 | 6.60 |
| 9 | C5-S45-SSA50 | 18.25 | 1.65 | 1.83 | 11.11 | 6.58 |
| 10 | C40-F17-SSA43 | 14.71 | 1.58 | 1.81 | 14.53 | 6.25 |
| 11 | River sand (Comparative Example) | — | — | — | 2.60 | 2.95 |

With reference to Table 4, Examples 1~10 underwent 28 days of curing time to obtain hydroscopic rates ranging from 5.53%~16.18% and compressive strengths ranging from 14.03 MPa~37.25 MPa. Example 5 has the best compressive strength, i.e., 37.25 MPa. If cost is to be taken into consideration, Example 8 is relatively suitable for use as the artificial sludge aggregate of the present invention because it uses less amount of cement, uses the water-quenched slag powder as a diluent and binder, and uses a large amount of the sludge ash, so that the cost thereof is minimized. Further, Example 8 has high compressive strength and low hydroscopic rate.

Figure 16:
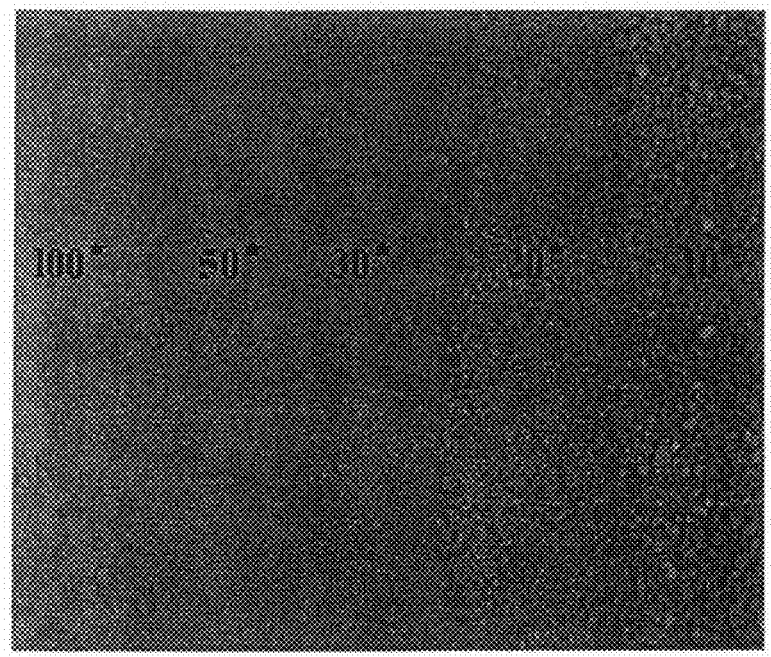
FIG. 16 shows a particle distribution of the fine aggregates of the present invention.
Figure 17:
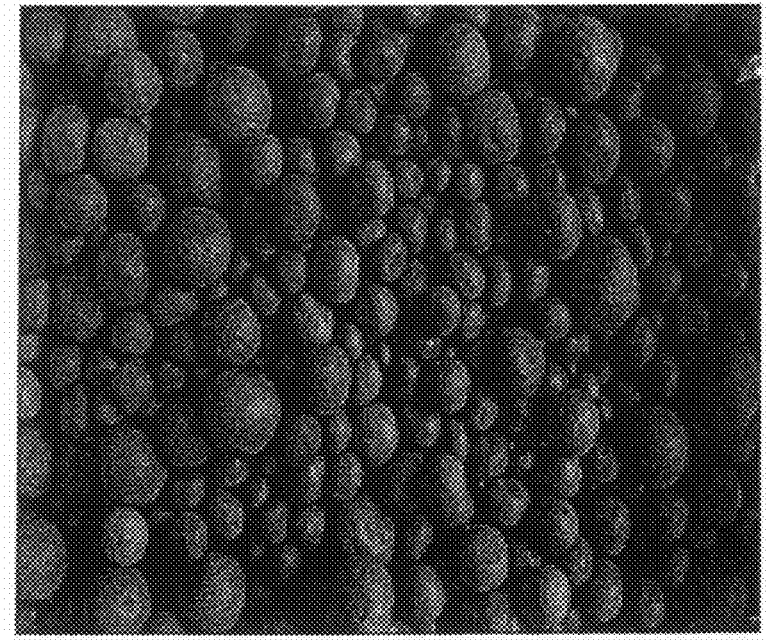
FIG. 17 shows a particle distribution of the coarse aggregates of the present invention.

Referring to FIGS. 16 and 17, in combination with Table 1, in order to conform to the grain size of natural river sand and stone, after granularizing, the artificial sludge aggregates are sieved to obtain coarse sludge aggregates having an average grain size smaller than 19 mm and fine sludge aggregates having an average grain size smaller than 4.76 mm. The particle size distribution of the fine sludge aggregates includes the grain sizes of the fine sludge aggregates that pass through ASTM sieve size #100, #50, #30, #20, and #10.

Figure 14:
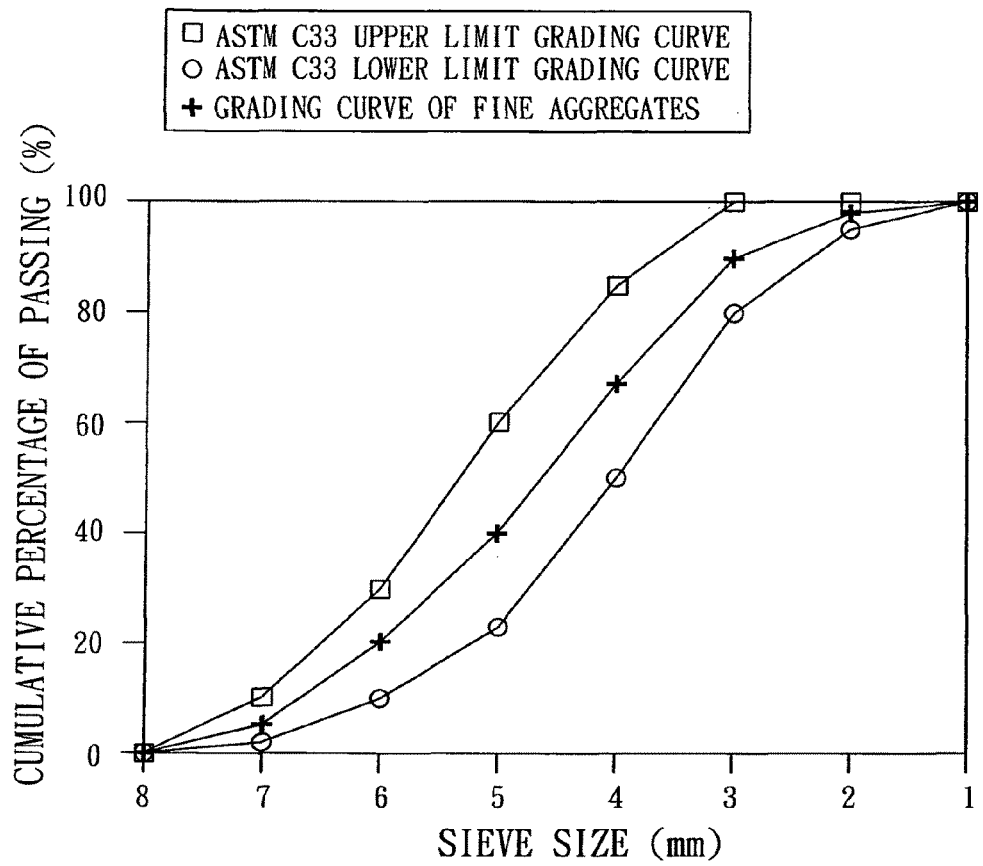
FIG. 14 is a graph illustrating a grading curve of fine sludge aggregates of the present invention falling within grading curves of upper and lower limits of ASTM C33.

Referring to FIG. 14, a grading curve of the fine sludge aggregates of the present invention is shown to fall within grading curves of upper and lower limits of ASTM C33, and the average grain distribution of the fine sludge aggregates is also illustrated.

Figure 15:
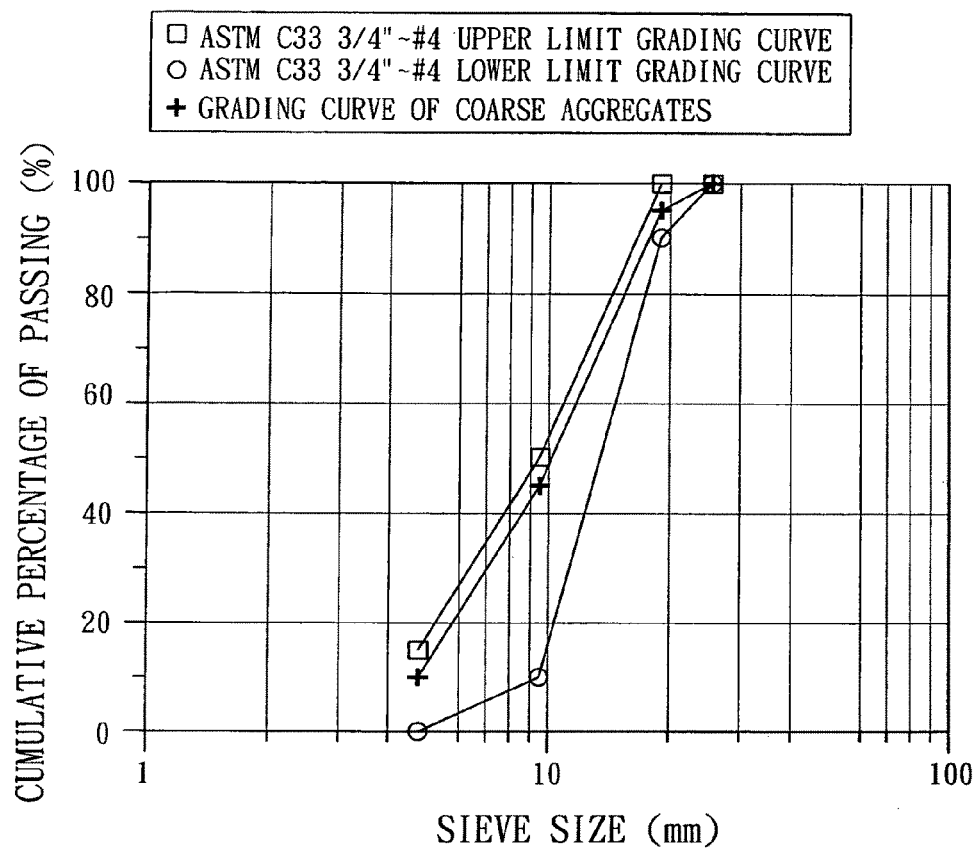
FIG. 15 is a graph illustrating a grading curve of coarse sludge aggregates of the present invention falling within the grading curves of the upper and lower limits of ASTM C33.

Referring to FIG. 15, a grading curve of the coarse sludge aggregates of the present invention is shown to fall within the grading curves of the upper and lower limits of ASTM C33, and the average grain distribution of the coarse sludge aggregates is also illustrated.

Step (E). Forming Concrete Products

The artificial sludge aggregates are mixed with an inorganic binder, a superplasticizer, and water to form concrete products in this step.

The inorganic binder must have hardening and diluting functions. Hence, the inorganic binder used in the present invention is made of a pozzolanic material, which may be selected from the group consisting of cement, fly ash, water-quenched slag powder, silicon ash, silica fume, natural pozzolans, rice husk ash, and the like. Preferably, the inorganic binder includes cement, water-quenched slag powder, and fly ash. The cement has a hardening effect, a specific gravity of 3.15, and a grayish white color. The water-quenched slag powder and the fly ash are used as a diluent that can be substituted for a portion of the cement. The water-quenched slag powder comes from wastes produced during iron-smelting, and has a specific gravity of 2.9 and a white color. The fly ash comes from the thermal power plant, and has a specific gravity of 2.3 and a light gray color. These materials can react with hydrated calcium hydroxide through a slow pozzolanic reaction, thereby resulting in a hardening effect and lowering the leaching process of heavy metals. In the examples, the superplasticizer is polycarboxylic acid type G.

The degree of densification of the concrete product of the present invention may be determined by the largest volumetric weight (specific weight) of the mixture that forms the concrete product. Experiments 1 and 2 were conducted to investigate the most preferred mix ratio of the mixture that provides a high level of densification. The results were plotted and shown in FIGS. 18 and 19.

Experiment 1

Figure 18:
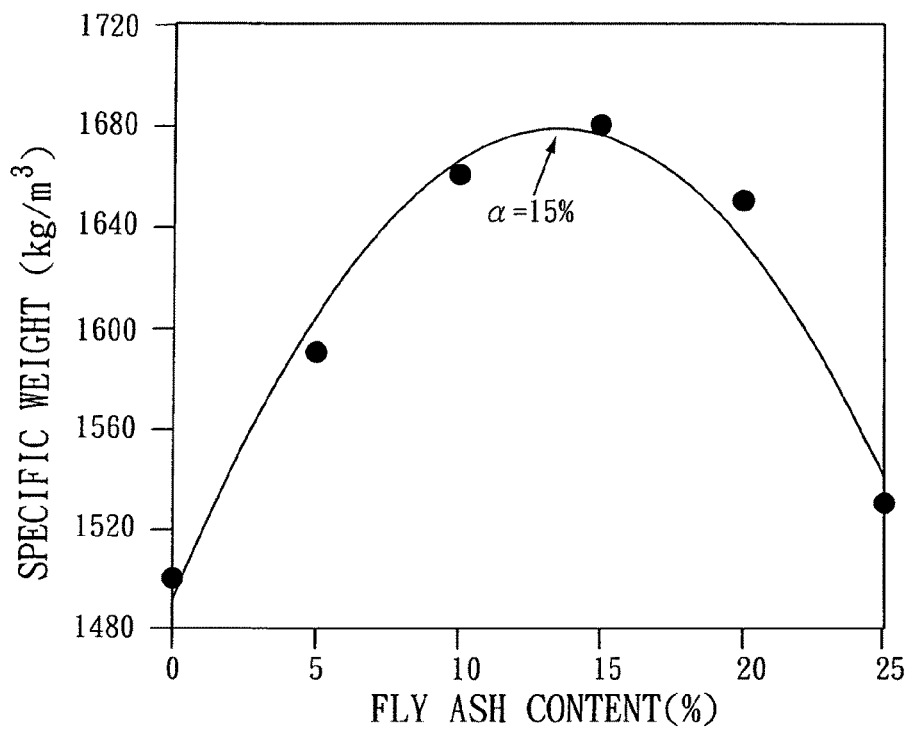
FIG. 18 is a curve illustrating the relationship between fly ash content and specific weight.

Fly ash was mixed with the fine sludge aggregate in different ratios, and the specific weights of the mixtures thereof were determined. The aforesaid mixture is described hereinafter as "overall fine aggregate." The percentages of the fly ash contents in the overall fine aggregate were plotted against the specific weights. The resulting curve is shown in FIG. 18. The curve manifests that the specific weight is maximum at the point "α" where the fly ash content is 15% by weight based on a total weight of the fine sludge aggregate plus the fly ash. Therefore, the most preferred overall fine aggregate contains 15% by weight of the fly ash.

Experiment 2

Figure 19:
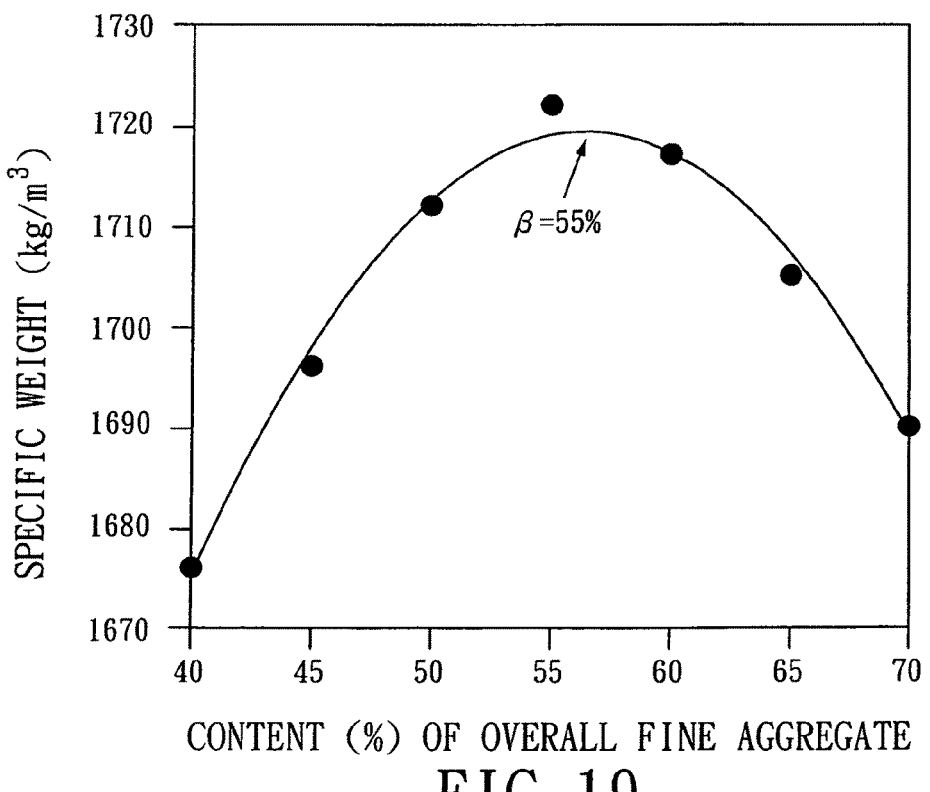
FIG. 19 is a curve illustrating the relationship between overall fine aggregate content and specific weight.

The overall fine aggregate which contains 15% by weight of the fly ash was mixed with the coarse sludge aggregate in different ratios, and the specific weights of the mixtures thereof were determined. The percentages of the overall fine aggregate were plotted against the specific weights. The resulting curve is shown in FIG. 19. The curve manifests that the specific weight is maximum at the point "β" where the overall fine aggregate content is 55% by weight. Therefore, to provide a densified concrete product, the most preferred percentage of the overall fine aggregate should be 55% by weight based on a total weight of the overall fine aggregate and the coarse sludge aggregate (i.e., a total weight of the artificial sludge aggregate plus the fly ash).

Figure 20:
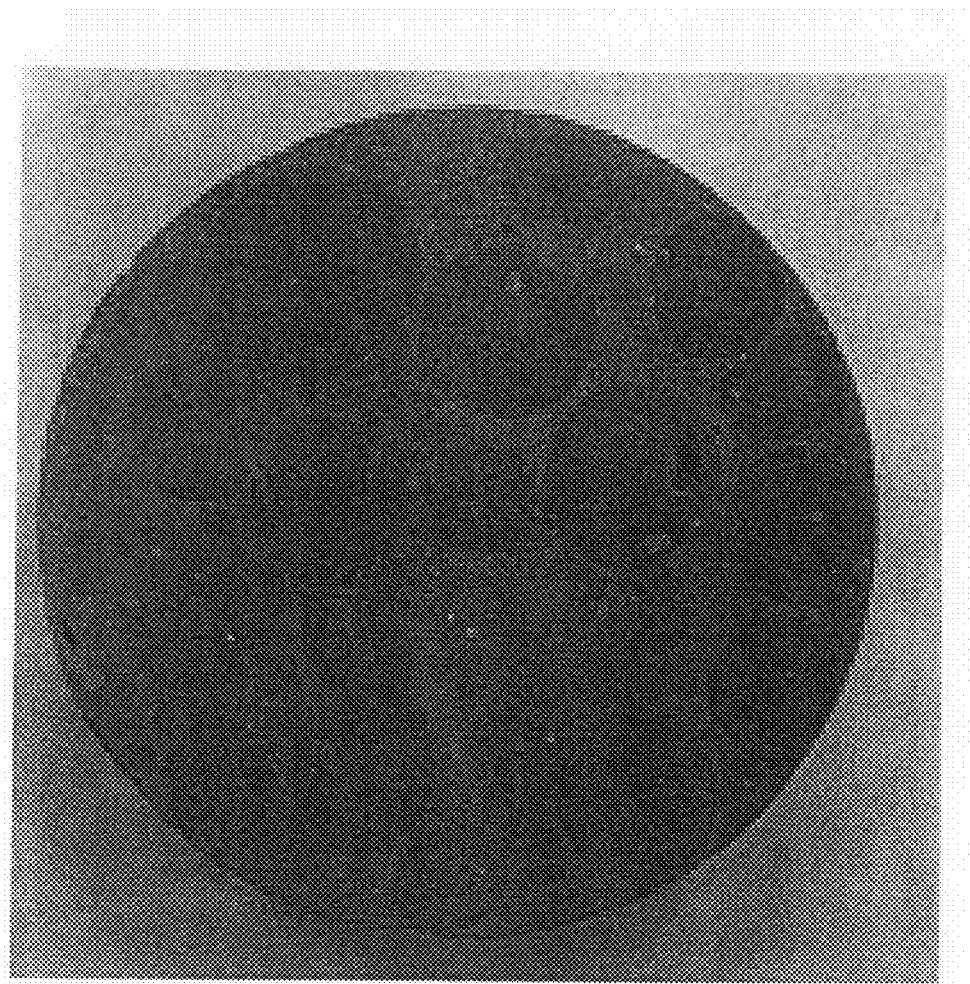
FIG. 20 shows a cross section of the concrete product of the present invention.

A concrete product obtained by the method of the present invention is shown in FIG. 20.

Table 5 shows Examples 11-17 of the composition for making the concrete product of the present invention, in which the water, the coarse and fine sludge aggregates, the inorganic binder, and the superplasticizer were mixed using the water-binder ratios shown in Table 5. During mixing, in order to achieve a predetermined slump of more than 20 cm and a slump flow of more than 60 cm, the superplasticizer was added, and the amount of water was reduced. The water-binder ratios used in examples 11-17 were 0.32, 0.36, 0.40, 0.44, 0.48, 0.52, and 0.56, respectively.

TABLE 5

| | | Example | | | | | | |
|---|---|---|---|---|---|---|---|---|
| | | 11 | 12 | 13 | 14 | 15 | 16 | 17 |
| Water (kg/m$^3$) | | 150.9 | 159.5 | 157.3 | 162.5 | 169.2 | 177.6 | 182.6 |
| Inorganic Binder | Cement (kg/m$^3$) | 320 | 303 | 265 | 251.6 | 235.7 | 222.9 | 210.9 |
| | Water-Quenched Slag Powder (kg/m$^3$) | 106.6 | 100.5 | 88.2 | 83.78 | 78.5 | 74.2 | 70.2 |
| | Fly Ash (kg/m$^3$) | 45 | 46.8 | 40 | 40 | 35.5 | 44 | 45 |
| Aggregate | Coarse (kg/m$^3$) | 760 | 750 | 770 | 770 | 780 | 780 | 785 |
| | Fine (kg/m$^3$) | 300 | 310 | 325 | 325 | 320 | 310 | 305 |
| Superplasticizer (kg/m$^3$) | | 6 | 7.5 | 7.5 | 6 | 5.5 | 4.8 | 4.8 |
| Unit Weight (kg/m$^3$) | | 1688.5 | 1677.3 | 1653 | 1638.88 | 1624.4 | 1613.5 | 1603.5 |
| Water-Cement Ratio (W/C) | | 0.47 | 0.53 | 0.59 | 0.65 | 0.72 | 0.80 | 0.87 |
| Water-Binder Ratio (W/B) | | 0.32 | 0.36 | 0.40 | 0.44 | 0.48 | 0.52 | 0.56 |

After mixing, the mixtures were formed into concrete blocks which were then subjected to a curing process. Curing times used in Examples 11-17 were 7 days, 28 days, 56 days, and 91 days to complete hardening of the mixtures and to obtain sludge aggregate concrete products. Each concrete product was tested for compressive strength, elastic modulus, pressure wave velocity, shear-wave velocity, dynamic modulus of elasticity, and dynamic Poisson's ratio. The test results of Examples 11-17 are shown in Table 6.

TABLE 6

| | | Example | | | | | | |
|---|---|---|---|---|---|---|---|---|
| | | 11 | 12 | 13 | 14 | 15 | 16 | 17 |
| Compressive strength $f_c'$ (MPa) | 7 days | 49.6 | 48.0 | 43.5 | 40.4 | 32.8 | 32.6 | 30.4 |
| | 28 days | 52.7 | 51.4 | 46.9 | 45.8 | 41.9 | 37.6 | 34.8 |
| | 56 days | 54.7 | 53.1 | 51.0 | 45.9 | 45.8 | 42.2 | 38.1 |
| | 91 days | 60.2 | 59.1 | 59.1 | 48.5 | 47.4 | 42.6 | 38.2 |
| Elastic Modulus $E_s$ (GPa) | 7 days | 25.2 | 25.0 | 24.3 | 23.3 | 23.1 | 23.1 | 22.9 |
| | 28 days | 26.3 | 26.1 | 25.8 | 25.5 | 25.1 | 24.9 | 24.8 |
| | 56 days | 27.1 | 27.7 | 26.6 | 26.5 | 26.6 | 26.1 | 25.5 |
| | 91 days | 27.6 | 28.2 | 27.1 | 27.4 | 27.5 | 27.0 | 26.4 |
| Pressure Wave $V_p$ (m/sec) | 7 days | 4510 | 4487 | 4426 | 4334 | 4314 | 4319 | 4287 |
| | 28 days | 4534 | 4517 | 4491 | 4459 | 4431 | 4410 | 4397 |
| | 56 days | 4604 | 4653 | 4558 | 4553 | 4558 | 4519 | 4465 |
| | 91 days | 4788 | 4839 | 4740 | 4735 | 4740 | 4700 | 4644 |
| Shear Wave $V_s$ (m/sec) | 7 days | 2481 | 2468 | 2434 | 2384 | 2373 | 2375 | 2358 |
| | 28 days | 2630 | 2620 | 2605 | 2586 | 2570 | 2558 | 2550 |
| | 56 days | 2855 | 2885 | 2826 | 2823 | 2826 | 2802 | 2768 |
| | 91 days | 2921 | 2952 | 2892 | 2926 | 2930 | 2904 | 2870 |
| Dynamic Modulus of Elasticity $E_d$ (GPa) | 7 days | 26.5 | 26.3 | 25.5 | 24.5 | 24.3 | 24.3 | 24.0 |
| | 28 days | 29.0 | 28.7 | 28.4 | 28.0 | 27.7 | 27.4 | 27.2 |
| | 56 days | 32.5 | 33.2 | 31.9 | 31.8 | 31.9 | 31.3 | 30.6 |
| | 91 days | 34.5 | 35.2 | 33.8 | 34.3 | 34.3 | 33.8 | 33.0 |
| Dynamic Poisson's Ratio $\mu_d$ | 7 days | 0.247 | 0.247 | 0.247 | 0.249 | 0.249 | 0.249 | 0.249 |
| | 28 days | 0.233 | 0.233 | 0.233 | 0.234 | 0.234 | 0.234 | 0.234 |
| | 56 days | 0.222 | 0.222 | 0.222 | 0.225 | 0.225 | 0.225 | 0.225 |
| | 91 days | 0.220 | 0.220 | 0.220 | 0.222 | 0.222 | 0.222 | 0.222 |

Generally, the elastic modulus of a cement concrete product changes according to the changes of the compressive strength, the water-binder ratio, the curing method, the curing time, mixing ratio, the degree of densification, etc. The elastic modulus of the sewage sludge aggregate concrete product according to the present invention also varies along with the compressive strength, the water-binder ratio, the curing method, the curing time, etc. When the water-binder ratio is small, the compressive strength is large. If the curing time is long, the elastic modulus increases. The Japanese Construction and Building Academy indicates that the dynamic modulus of elasticity of soft rock ranges from 660~1200 MPa depending on the degree of cracks due to erosion. The dynamic modulus of elasticity of the sludge aggregate concrete products of examples 11-17 ranges from 24.3~35.2 GPa, which is considerably higher than that of the soft rock. This means that examples 11-17 of the present invention have relatively good dynamic modulus of elasticity.

Figure 12:
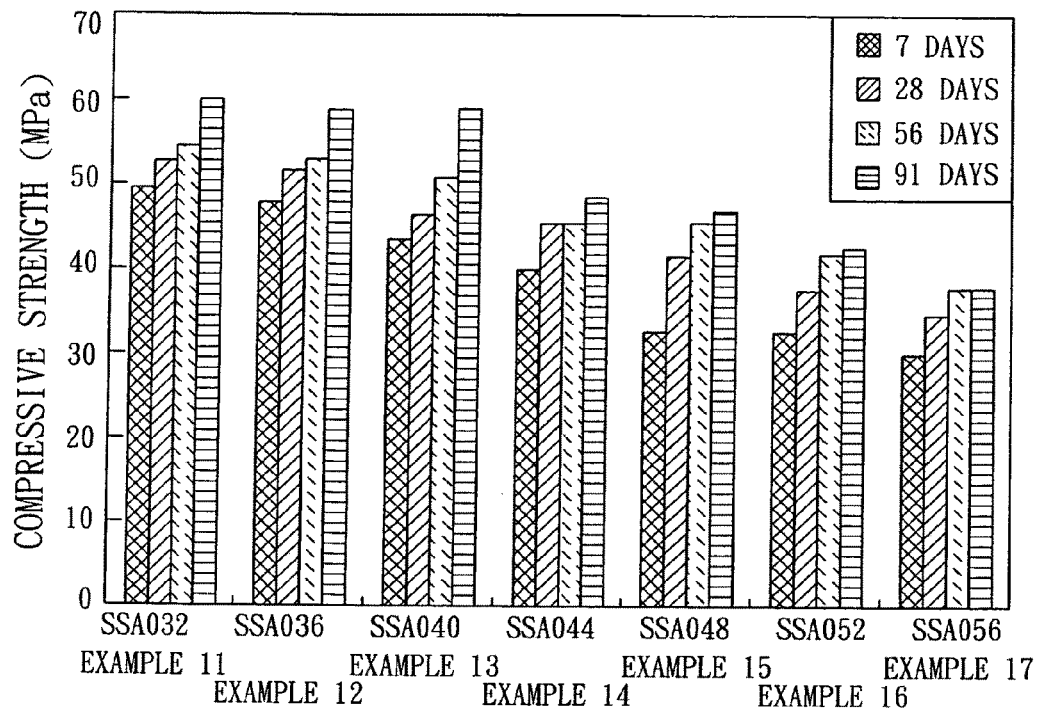
FIG. 12 is a chart illustrating compressive strength over time for Examples 11-17.

Referring to FIG. 12, the compressive strengths of Examples 11-17 increase as the curing time increases. When the curing time is 7 days, the compressive strength is 94.2% of that resulting from the curing time of 28 days. When the curing time is 91 days, the compressive strength is 114.3% of that resulting from the curing time of 28 days. Example 11 has the highest compressive strength.

Figure 13:
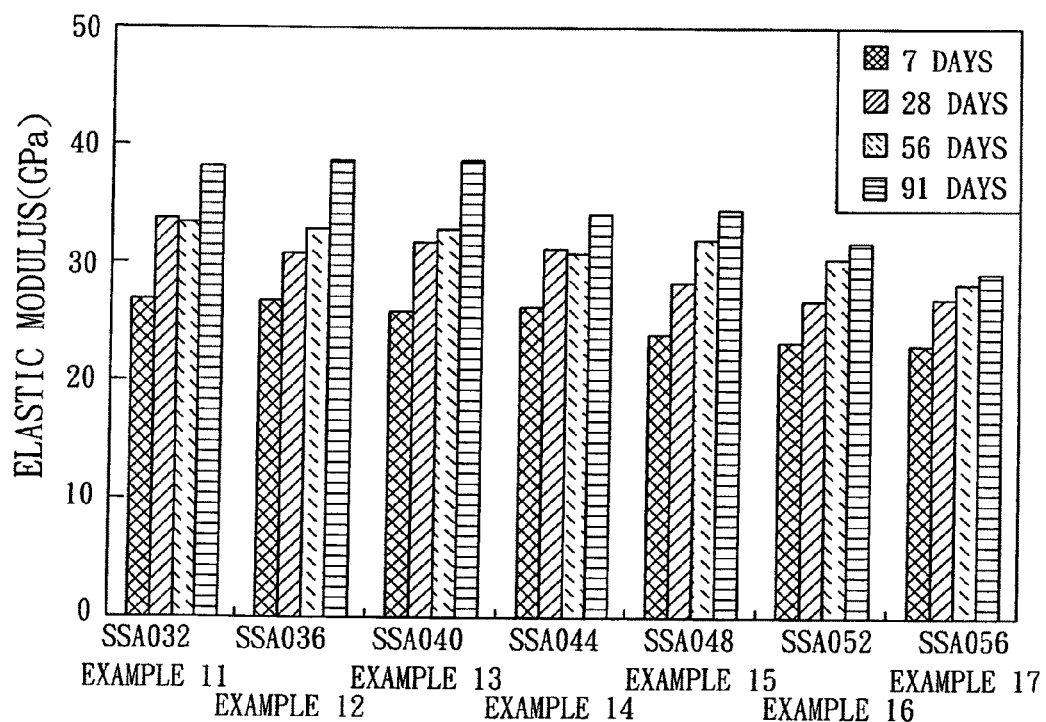
FIG. 13 is a chart illustrating elastic modulus over time for Examples 11-17.

Referring to FIG. 13, the elastic moduli of examples 11-17 increase as the curing time increases. Example 11 has the highest elastic modulus, whereas Example 17 has the lowest elastic modulus.

Referring to Table 6, tests were performed to examine thermal conductivity of Examples 11-17 having the water-binder ratios of 0.32, 0.36, 0.40, 0.44, 0.48, 0.52, and 0.56.

TABLE 7

| Example | Water-Binder Ratio (W/B) | 7 days Curing time Coefficient of Thermal Conductivity λ (W/m * K) | 28 days Curing time Coefficient of Thermal Conductivity λ (W/m * K) | 56 days Curing time Coefficient of Thermal Conductivity λ (W/m * K) | 91 days Curing time Coefficient of Thermal Conductivity λ (W/m * K) |
|---|---|---|---|---|---|
| 11 | 0.32 | 0.60 | 0.63 | 0.54 | 0.55 |
| 12 | 0.36 | 0.61 | 0.58 | 0.57 | 0.54 |
| 13 | 0.40 | 0.61 | 0.61 | 0.62 | 0.60 |
| 14 | 0.44 | 0.59 | 0.61 | 0.68 | 0.59 |
| 15 | 0.48 | 0.61 | 0.56 | 0.61 | 0.60 |
| 16 | 0.52 | 0.63 | 0.61 | 0.61 | 0.62 |
| 17 | 0.56 | 0.62 | 0.54 | 0.61 | 0.59 |

The coefficient of thermal conductivity is an important index representing the thermal conductivity of aggregates. The thermal conductivity of a concrete product is related to its heat insulating effect. The lower the coefficient of the thermal conductivity, the poorer the thermal conductivity, and the better the heat insulating effect. A common heavy concrete product has coefficient of thermal conductivity ranging from 1.0 to 1.5 W/mk, whereas a common light weight aggregate has coefficient of thermal conductivity ranging from 0.4 to 0.8 W/mk. From the test results of examples 11-17, the coefficient of thermal conductivity ranges from 0.54 to 0.68 W/mk, which belongs to a concrete product with light aggregates. Since the light aggregate concrete product per se has larger quantity of gaps to reduce transmission of heat, the thermal conductivity thereof is lowered. Therefore, the sludge aggregate concrete products of the present invention are good heat insulation materials.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A method for making a concrete product, comprising:
   (A) collecting and dehydrating sludge;
   (B) sintering the sludge at a temperature of about 800~900° C.;
   (C) grinding and sieving the sludge through a screen having a sieve size of 0.15 mm which conforms to ASTM sieve size #100 to obtain sludge ash;
   (D) forming the sludge ash into an artificial sludge aggregate by mixing the sludge ash with an inorganic binder and water, followed by granularizing; and
   (E) mixing the artificial sludge aggregate with an inorganic binder and water to form the concrete product.

2. The method of claim 1, wherein the artificial sludge aggregate includes fine and coarse sludge aggregates, the coarse sludge aggregates having an average grain size smaller than 19 mm and the fine sludge aggregates having an average grain size smaller than 4.76 mm.

3. The method of claim 1, wherein in step (E), the ratio of water to the inorganic binder ranges from 0.32 to 0.56.

4. The method of claim 2, wherein the inorganic binder used in step (D) or (E) is made of a pozzolanic material which is selected from the group consisting of cement, fly ash, water-quenched slag powder, silicon ash, silica fume, natural pozzolan, and rice husk ash.

5. The method of claim 4, wherein the inorganic binder includes cement, water-quenched slag powder, and fly ash.

6. The method of claim 5, wherein the content of the fly ash is 15% by weight based on a total weight of the mixture of the fine sludge aggregate and the fly ash.

7. The method of claim 2, wherein the content of the mixture of the fine sludge aggregate and the fly ash is 55% by weight based on a total weight of the artificial sludge aggregate plus the fly ash.

8. The method of claim 2, wherein in step (E), a superplasticizer is added to the coarse and fine sludge aggregates and the inorganic binder.

\* \* \* \* \*